Dec. 10, 1963    R. L. CARLSON    3,113,606
DEVICE FOR REPAIRING TUBELESS TIRE CASING OR THE LIKE
Filed Dec. 15, 1960
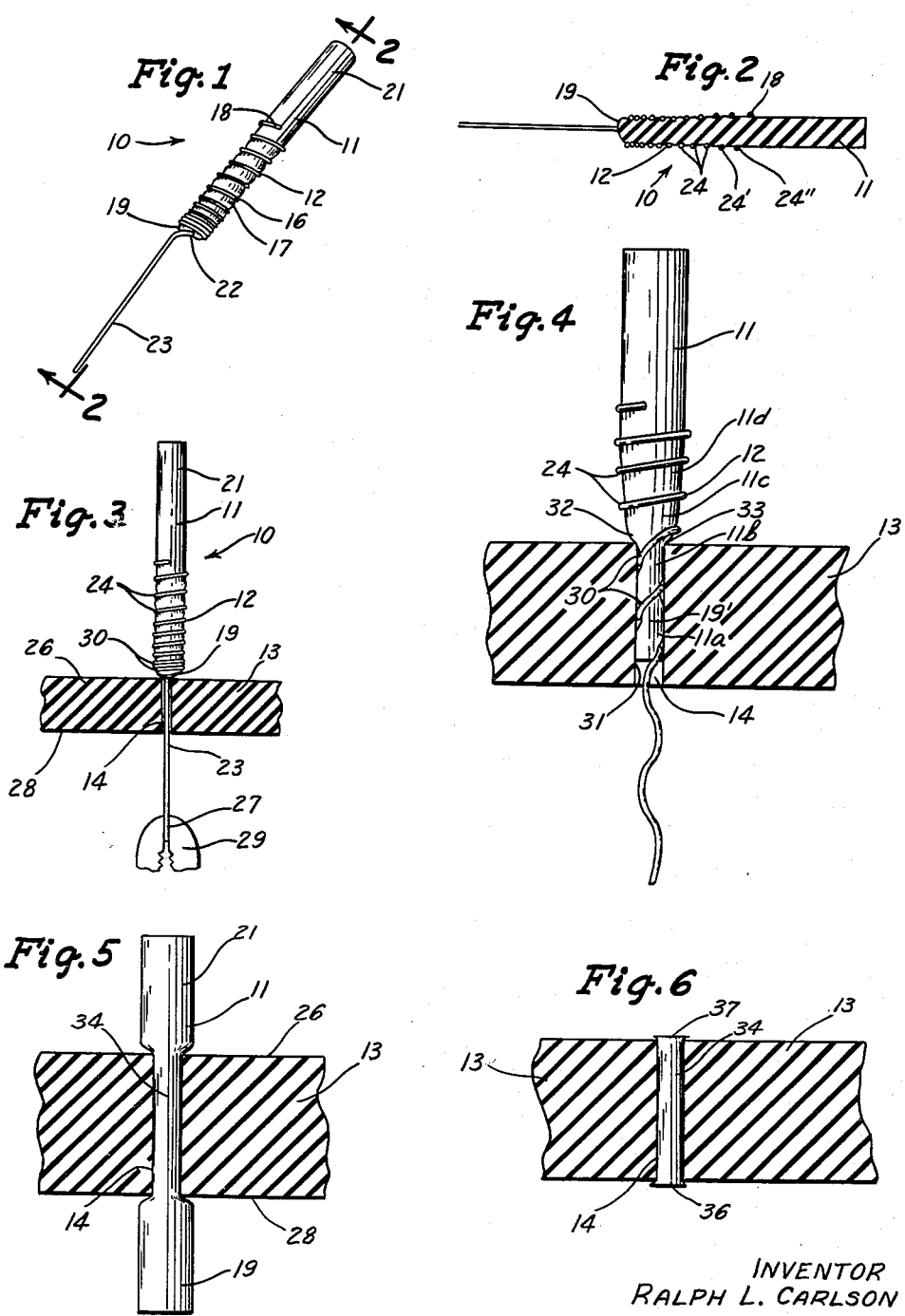
INVENTOR
RALPH L. CARLSON
BY
Lowell & Henderson
ATTORNEYS United States Patent Office 3,113,606
Patented Dec. 10, 1963

3,113,606
DEVICE FOR REPAIRING TUBELESS TIRE CASING OR THE LIKE
Ralph L. Carlson, Des Moines, Iowa
(Boones Ferry and Bryant, Lake Grove, Oreg.)
Filed Dec. 15, 1960, Ser. No. 75,979
2 Claims. (Cl. 152—370)

This invention refers generally to an apparatus and a method for plugging a hole in a wall of resilient material, and more particularly to a rubber plug device and to a method for repairing a hole in an automobile tire casing.

It is an object of this invention to provide a novel device for plugging a hole in an automobile tire casing made by a nail or the like.

It is another object of this invention to provide a novel method of repairing a hole in an automobile tire casing.

A further object of this invention is to provide a device for plugging a hole in a tubeless tire casing wherein a plug of resilient material is pulled into the hole to permanently plug the hole against the passage of air through it.

Yet another object of this invention is the provision of a rubber plug about which is wound a length of flexible wire in a helical manner, such that upon pulling the wire through a hole in an automobile tire casing the plug is subjected to a concurrent transverse and axial deformation which acts to advance the plug through the hole.

Another object of this invention is to provide a tire repair device wherein a flexible wire is wound around a resilient plug in a helical formation, wherein upon pulling a free end of the wire away from the plug the plug is simultaneously compressed and stretched into a conical formation tapering toward the direction of pull of the wire.

Still another object of this invention is to provide a novel method of plugging a hole in a wall of resilient material by continually compressing and elongating a plug of resilient material, of a diameter normally larger than the diameter of the hole, into a form of a sufficiently small diameter for passage into and through the hole.

Yet a further object of this invention is to provide a device for accomplishing the above mentioned objectives which is economical, easily installed, and effective in service.

These objects and other features and advantages will become readily apparent upon reference to the following description when taken in conjunction with the accompanying drawings, wherein:

FIG. 1 is a full scale perspective view of the tire repair device of this invention;

FIG. 2 is a cross sectional view of the tire repair device taken along the line 2—2 in FIG. 1;

FIG. 3 is an elevational view of the tire repair device at the initial stage of its insertion into a hole in a wall, shown in section, of resilient material such as an automobile tire wall;

FIG. 4 is an enlarged view of the tire repair device in an intermediate stage of the insertion, and showing the rubbing action of the wire as it unravels;

FIG. 5 is an enlarged view of the plug of the tire repair device in the final stage of the insertion; and FIG. 6 is an enlarged view of the remainder of the plug of the tire repair device after the protruded ends have been removed.

Referring now to the drawings, the tire repair device of this invention is indicated generally at 10 in FIG. 1 and comprises an elongated, cylindrical plug 11 of resilient material such as rubber, and a length of flexible wire 12, such as commonly designated "mechanic's wire," which is wound around the plug 11 as illustrated. As described in detail hereinafter, the device 10 is used to repair a wall of resilient material, such as the casing or wall 13 (FIG. 3) of an automobile tire of the tubeless type which has been punctured by a nail or the like resulting in an elongated, substantially circular hole 14 remaining in the tire wall 13.

The plug 11, illustrated in FIGS. 1–3 in full scale and before being wrapped by the wire 12, is formed of commercially available rubber stock having a diameter of approximately one-quarter inch. The plug 11 is cut to a length of approximately two inches. It is to be understood that plugs of different diameters, such as three-eighths or five-sixteenths inch can be used, and that the dimensions of the plug depend upon the size of the hole 14. The particular plug 11, as described with a ¼" diameter and a 2-inch length, is particularly adapted to repair a hole made in a conventional automobile tire of a fourteen to sixteen inch type, and wherein the hole 14 has been made by an eight or ten-penny nail, for example.

The wire 12 is preferably light mechanic's wire, although heavy wire is satisfactory, and in the present embodiment is approximately ten inches in length. One longitudinal portion 16 (FIG. 1) of the wire 12 is wrapped about a portion 17 of the plug, beginning with an end 18 of the wire 12 intermediate the ends 19 and 21 of the plug 11, and with the wire portion 16 curving in a helical manner about the plug portion 17. At the plug end 19, the wire is tapered inwardly at 22 toward the longitudinal axis or center of the plug 11, and with the free remaining longitudinal portion 23 of the wire 12 extended outwardly of the plug end 19 in a direction axially of the plug 11 (FIG. 2).

As clearly shown in FIG. 2, the spacing between the coils 24 of the wire 12, longitudinally of the plug 11, gradually diminishes from the wire end 18 toward the plug end 19, whereat the coils 24 are in a side-by-side relation. In experimenting with the spacing of the coils 24, as will be clarified hereinafter, it was found that where all the coils 24 were grouped closely together like those at the plug end 19, in use the plug 11 became too compressed and elongated. Further, where the coils were spaced apart a distance greater than that illustrated, for example coils 24' and 24" are spaced apart approximately twice the cross sectional diameter of a coil 24, in use the plug 11 resisted compression and elongation to such an extent that the wire 12 unraveled too readily from the plug 11.

Going to the use of the device 10 to repair the tubeless tire wall 13, the following method is preferred. Initially, the free portion 23 (FIG. 3) of the wire 13 is inserted through the hole 14 (FIG. 3) from one side 26 of the wall 13 so that the outer end 27 of the free portion 23 protrudes from the other side 28. A pulling force is then applied to the end 27, as for example by a pair of pliers the nose 29 of which is illustrated in FIG. 3, wherein the pulling force is applied axially of the tire hole 14 and in a direction to pull the device 10 through the hole 14. As the wire 13 is being pulled, and as the diameter of the hole 14 is smaller than the diameter of the plug 11, the resistance of the resilient tire wall 13 about the hole 14 (FIG. 3) against the plug end 19 is sufficient to cause the wire coils 30 immediately adjacent the hole 14 to assume a smaller helical formation and to elongate (FIG. 4)—that is to increase their longitudinal spacing—so as to simultaneously compress and elongate or stretch the plug 19 until it is small enough, as at 19' (FIG. 4), to be pulled into the hole 14.

The action of the wire 12 on the plug 11 may be termed a rubbing action which connotes in this instance the subjecting of the plug 11 to combined axial and transverse pressures and frictional forces by the wire's coils 24 as the wire is pulled through the hole 14. It may be assumed that as the plug 11 is pulled into the hole 14, the adjacent segments 11a, 11b, etc. of the plug bulge outwardly and against the wall 31 of the hole 14. Therefore, in addition to the resistance of the wall 13 to the entry of the plug 11, as emphasized by the formation of a shoulder 32 (FIG. 4) in the plug 11 at the entrance 33 to the hole 14, continued resistance is had by the wall 13 within the hole 14 by the frictional engagement of the wall 13 with the bulging plug segments 11a, 11b, etc.

Thus, as the wire 12 continues to be pulled through the hole 14, a continuous compression and stretching action is applied to the plug 11 as each segment 11c, 11d, etc. approaches the hole entrance 33, and which rubbing action continues against the plug 11 within the hole 14 as the wire 12 is pulled from the plug in an unraveling manner. When the wire 12 has been pulled completely through the hole 14 (FIG. 5) the plug 11 remains extended through the hole with the two ends 19 and 21 protruded from the sides 28 and 26, respectively, of the wall 13 and with an intermediate portion 34 compressed within the hole 14. The ends 19 and 21 can then be clipped off so that rivet-like heads 36 and 37, respectively (FIG. 6), remains, the heads 36 and 37 helping to retain the remaining plug portion 34 within the hole 14.

The operation of using the plug device 10 to repair the punctured wall 13 having been described, the aforementioned remarks as to the spacing of the coils 24 can be better appreciated. In reiteration, should the coils 24 be grouped too closely, the tendency would be for the plug 11 to be pulled completely through the hole 14 with the wire 12, as there might not be a sufficient resistance by the wall 13 at the hole entrance 33 and within the hole 14, there not being a sufficient bulging of the plug as at the segments 11a and 11b (FIG. 4). Also, should the coils 24 be spaced apart too much, the tendency would be a too quick unraveling of the wire 12 so that only the end 19′ (FIG. 4) of the plug 11 would enter the hole 14.

The last result of too quick an unraveling could also occur if the wire 12 is wound about the plug 11 a shorter length than that illustrated. For example, approximately one-half the original length of the plug 12 is shown as being wound, thus should only about one-third the length be wound, the plug 11 wouldn't necessarily be pulled completely through the hole 14. It must be understood however, that the result depends at times upon the condition of the hole 14, and as to whether it is a clean puncture or not. Should the hole 14 seem a bit too small to take the device 10, or should it be a ragged hole, the application of a rubber cement to the device 10 before it is inserted into the hole 14 often makes the insertion easier, and tends to insure an airtight bond between the remaining plug portion 34 and the hole wall 31.

Therefore, although a preferred embodiment of the invention has been described herein, various alterations and modifications can be made thereto without departing from the scope of the invention as defined in the appended claims. For example, under certain circumstances it was found that by winding the wire 16 in a combined helical-spiral manner, wherein the diameter of the coils 24 decreased as they approached the end 19 of the plug and the axial center of the plug, the plug 11 was easier to insert into the hole 14. The reason was that this type of winding produced a tapering end portion 17 of the plug toward the end 19 to be first inserted into the hole.

I claim:

1. A device for plugging a hole made by a nail or the like in a wall of resilient material comprising:
   (a) a cylindrical plug of resilient material having a length greater than the thickness of the wall into which it is to be inserted and a diameter greater than the diameter of the hole,
   (b) a length of easily deformable wire having
   (c) a first longitudinal portion which extends generally longitudinally outwardly from one end of said plug, said first portion having a length which is greater than the thickness of the wall, and
   (d) a second portion constituting the remainder of said wire, said second portion having a plurality of convolutions positioned around said one plug end so that when the wire is pulled through said hole the second portion of the wire is deformed from a coil shape into a substantially straight shape whereby to simultaneously compress and elongate the plug as it moves into said hole.

2. The device defined in claim 1 wherein:
   (a) the convolutions of the second portion of the deformable wire taper in a spiral manner beginning at said first portion and terminating substantially intermediate the ends of the plug, the portion of the plug confined within the second portion of the deformable wire being compressed into a tapered formation and the spacing between adjacent convolutions and the diameter of said convolutions of the second portion of the wire being gradually increased from said one plug end substantially to the plug midpoint.

References Cited in the file of this patent

UNITED STATES PATENTS

| | | |
|---|---|---|
| 1,754,624 | Griffiths | Apr. 15, 1930 |
| 2,164,278 | Kellems | June 27, 1939 |
| 2,280,006 | Pfeifer | Apr. 14, 1942 |

FOREIGN PATENTS

| | | |
|---|---|---|
| 277,150 | Great Britain | Sept. 15, 1927 |